United States Patent Office 3,033,692
Patented May 8, 1962

3,033,692
COMPOSITION FOR PROVIDING AN EFFECTIVE WATER-VAPOR BARRIER ON POSTAGE STAMPS AND OTHER ADHESIVE SURFACES
Robert F. Herrling, 1111 S. Ridge Road, Lake Forest, Ill.
No Drawing. Filed Oct. 8, 1959, Ser. No. 845,089
5 Claims. (Cl. 106—2)

This invention relates to the protection of adhesive surfaces from the effects of water vapor, and more particularly to a novel composition for the preservation of water-pervious adhesive surfaces on postage stamps and labels under conditions of high humidity.

One of the problems encountered by stamp collectors is the effect of high humidity on the adhesive surfaces of postage stamps. The effect is encountered largely during storage of stamps. Valuable stamps are frequently stored in safe-deposit boxes in bank vaults. Such vaults are normally maintained at a relative humidity of 60–80% as a measure to prevent the deterioration of valuable papers commonly stored in such vaults. Under the conditions of high humidity thus encountered, the gum or adhesive on postage stamps tends to soften and to become tacky. As a result, the sheets of stamps stick to each other and can only be separated by soaking or steaming the sheets. This practice tends to depreciate the value of the sheets as collector's items, since the soaking or steaming operation alters the original condition of the stamps. With collections of great value, the loss in value thus incurred can be a very substantial factor.

Numerous solutions have been offered for this problem. In most instances, however, the protection afforded by the solution is found to be inadequate over a substantial period of time, and is frequently offset by alteration of the adhesive on the stamp to the extent that the original condition of the stamps is permanently impaired. Various substances such as talc, whiting and cornstarch which may be dusted on the stamps have been found to fail to prevent the penetration of water vapor into the adhesive under conditions of high humidity. As a result, the adhesive frequently absorbs sufficient water vapor to become quite soft and even fluid when the high humidity condition prevails for a period of time. When the film of dusting material fails to serve as a water-vapor barrier, the dusting material itself tends to become incorporated in the fluidized adhesive, with the result that the nature of the adhesive is altered and the stamp loses its original conditions. This frequently results in a loss of value in the stamps to the collector.

One of the objects of the present invention is to provide an effective water-vapor barrier for the adhesive surface of postage stamps without impairing the original condition of the stamps.

Another object is to provide a novel composition which can be dusted on the adhesive surface of postage stamps to form a thin film having the property of providing an effective water-vapor barrier under conditions of relatively high humidity without impairing the original condition of the stamps.

Further objects will become apparent from the following description and examples.

According to the present invention, generally stated, a composition having the property of providing an effective water-vapor barrier under conditions of high humidity when dusted on the adhesive surface of postage stamps to form a thin film thereon is provided by thoroughly blending 70–80 parts by weight of finely divided zinc stearate with 10–15 parts by weight of finely divided zinc palmitate and 10–15 parts by weight of talc, to provide 100 parts by weight of the composition. The ratio of the components in the composition has been found to be quite critical. The composition thus defined exhibits a high electrostatic charge when agitated. When a portion of the composition is dusted on the adhesive surface of postage stamps, the excess can be removed with a dry cloth or a soft brush, leaving a uniformly thin layer of the composition firmly adherent to the adhesive surface. Stamps thus treated may be exposed to a humid atmosphere for long periods of time with no evidence of softening of the adhesive and no tendency for the adhesive to stick to other stamps when sheets of stamps are placed in contact with each other. Stamps provided with this barrier have been exposed to a humid atmosphere of 95% relative humidity with no evidence of softening of the adhesive. Untreated stamps when thus exposed show marked deterioration of the adhesive to an extent where the glue tends to become very fluid.

In order to achieve the desired result, all three of the components, employed in the proportions defined hereinbefore, have been found to be essential. A variation of about 10% on either side of the range for each component results in a composition which when applied to the adhesive surface of stamps fails to provide an adequate water-vapor barrier under conditions of high humidity.

The films formed by the compositions are quite thin and uniform. The top side of the stamp may also be dusted without impairing the original condition of the stamps. The barrier film does not interfere with the adhesive properties of the gum. For example, the adhesive may be wetted with water in the usual manner and the stamps thereafter applied to an envelope. Stamps thus applied are found to be firmly adherent in the usual manner.

The following examples will serve to illustrate the novel compositions of the present invention.

EXAMPLE I

A mixture of 70 parts by weight of finely divided zinc stearate, 15 parts by weight of finely divided zinc palmitate and 15 parts by weight of talc is prepared. The components are thoroughly blended, for example in a ball mill, until a uniform mixture is obtained. A portion of the mixture is dusted on the adhesive surface of a sheet of postage stamps. The excess is removed with a camel's hair brush or a soft cloth, leaving a thin, transparent layer on the stamps. The top side of the stamps is treated in like manner. The stamps are placed in a humidity cabinet maintained at 95% relative humidity. An untreated sheet is exposed at the same time to the same environment. After 30 minutes, the stamps are removed from the humid atmosphere and examined. The glue on the treated stamps remains firm and non-tacky. The glue on the untreated stamps starts to run after 10 minutes and is quite fluid at the end of the test. Treated stamps stored in a bank vault at 60–80% humidity for several months show no sign of tackiness or tendency to adhere to each other. Untreated stamps under the same conditions are tacky and adherent to each other.

EXAMPLE II

A mixture of 80 parts by weight of finely divided zinc stearate, 10 parts by weight of finely divided zinc palmitate and 10 parts by weight of finely divided talc is prepared. The components are thoroughly blended until a uniform mixture is obtained. The composition when tested on stamps as described in Example I results in the formation of an effective water-vapor barrier on postage stamps.

EXAMPLE III

A mixture of 75 parts by weight of finely divided zinc stearate, 12½ parts by weight of finely divided zinc palmitate and 12½ parts by weight of finely divided talc is prepared. The components are thoroughly blended in a ball mill until a uniform mixture is obtained. The composition when applied to postage stamps as described in Example I is found to provide an effective water-vapor barrier on postage stamps under relatively high humidity conditions.

EXAMPLE IV

A mixture of 75 parts by weight of finely divided zinc stearate, 15 parts by weight of finely divided zinc palmitate and 10 parts by weight of finely divided talc is prepared. The components are thoroughly blended in a ball mill until a uniform mixture is obtained. The composition when applied to postage stamps as described in Example I is found to provide an effective water-vapor barrier on postage stamps under various humidity conditions.

EXAMPLE V

A mixture of 75 parts of finely divided zinc stearate, 10 parts by weight of finely divided zinc palmitate and 15 parts by weight of finely divided talc is prepared. The components are thoroughly blended in a ball mill until a uniform mixture is obtained. The composition when applied to postage stamps as described in Example I is found to provide an effective water-vapor barrier on postage stamps.

The following table will serve to illustrate the criticality of the proportions of the components of the composition of this invention in terms of the effectiveness of the barrier film produced by the composition when dusted on sheets of postage stamps and removing the excess, leaving a thin film on the stamps, in the manner described hereinbefore. In those instances in which the barrier effectiveness is rated excellent, the stamps exhibited no curling and the glue remained firm.

Table I

| Zn Stearate (Parts by wt.) | ZnPalmitate (Parts by wt.) | Talc (Parts by wt.) | Barrier Effectiveness at 95% Rel. Humidity for 30 minutes |
|---|---|---|---|
| 0 | 100 | 0 | Substantially zero. |
| 40 | 30 | 30 | Poor; glue runs. |
| 50 | 50 | 0 | Do. |
| 50 | 25 | 25 | Do. |
| 60 | 20 | 20 | Unsatisfactory; glue soft. |
| 70 | 15 | 15 | Excellent. |
| 75 | 12.5 | 12.5 | Do. |
| 75 | 15 | 10 | Do. |
| 75 | 10 | 15 | Do. |
| 80 | 10 | 10 | Do. |
| 90 | 5 | 5 | Poor; glue runs. |
| 100 | 0 | 0 | Substantially zero. |

The composition of the present invention shows no tendency to separate into the several components or otherwise to become non-uniform on standing. The composition does not appear to absorb moisture or to otherwise deteriorate over long periods of time. The composition is desirably packaged in containers from which small portions can be removed for application to stamps. A desirable package comprises a plastic envelope from which a corner can be cut to render the composition available for use. The composition may be applied as a thick coating on stamps or the excess may be removed, leaving a thin film. The film may be removed with the aid of a damp cloth if desired. Stamps protected with a barrier film of the composition exhibit no curling during storage in humid areas.

While the application of the composition of the present invention has been described herein in conjunction with postage stamps, the composition is equally applicable to labels and other gummed surfaces that are normally softened and rendered tacky by means of water, for the purpose of providing an effective barrier to water vapor resulting from conditions of relatively high humidity during use or storage.

The zinc stearate and zinc palmitate employed in the preparation of the composition of the present invention are normally prepared as precipitates and are consequently available in finely divided form as manufactured. Talc is also available in substantially the same degree of fineness.

Others may practice the invention in any of the numerous ways which will be suggested to one skilled in the art upon a reading of this specification. It is intended that all such practice of the invention be included hereunder, provided it falls within the scope of the appended claims.

I claim:
1. A composition for application to adhesive surfaces that are normally softened and rendered tacky by water for the purpose of providing an effective barrier to water-vapor consisting of a uniform mixture of about 70–80 parts by weight of finely divided zinc stearate, about 10–15 parts by weight of finely divided zinc palmitate and about 10–15 parts by weight of finely divided talc.

2. A composition for application to postage stamps for the purpose of providing an effective barrier to water-vapor consisting of a uniform blend of 75 parts by weight of finely divided zinc stearate, 12.5 parts by weight of finely divided zinc palmitate and 12.5 parts by weight of finely divided talc.

3. A composition for application to postage stamps for the purpose of providing an effective barrier to water-vapor consisting of a uniform blend of 70 parts by weight of finely divided zinc stearate, 15 parts by weight of finely divided zinc palmitate and 15 parts by weight of finely divided talc.

4. A composition for application to postage stamps for the purpose of providing an effective moisture barrier to water-vapor consisting of 80 parts by weight of finely divided zinc stearate, 10 parts by weight of finely divided zinc palmitate and 10 parts by weight of finely divided talc.

5. A method for providing an effective water-vapor barrier on adhesive surfaces that are normally softened and rendered tacky by water comprising dusting on said surfaces a composition consisting of a uniform blend of about 70–80 parts by weight of finely divided zinc stearate, about 10–15 parts by weight of finely divided zinc palmitate and about 10–15 parts by weight of finely divided talc.

References Cited in the file of this patent

UNITED STATES PATENTS

| | | |
|---|---|---|
| 1,429,407 | Coddington | Sept. 19, 1922 |
| 1,707,684 | Picker | Apr. 2, 1929 |
| 1,818,699 | Dunsenbury | Aug. 11, 1931 |
| 2,218,586 | Quaedvlieg | Oct. 22, 1940 |
| 2,608,493 | Cunder | Aug. 26, 1952 |
| 2,809,121 | Davis | Oct. 8, 1957 |
| 2,852,404 | Satterthwaite | Sept. 16, 1958 |